US012807000B1

(12) United States Patent
Tsimhoni et al.

(10) Patent No.: US 12,807,000 B1
(45) Date of Patent: Nov. 24, 2026

(54) SYSTEM AND METHOD FOR ADJUSTING A DISPLAY ON A DIGITAL DISPLAY FOR A VEHICLE

(71) Applicant: GM Global Technology Operations LLC, Detroit, MI (US)

(72) Inventors: Omer Tsimhoni, Bloomfield Hills, MI (US); Ron Hecht, Raanana (IL); Yael Shmueli Friedland, Tel Aviv (IL); Charles R. Quinn, Pleasant Ridge, MI (US); Tzvi Philipp, Bet Shemesh (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 3 days.

(21) Appl. No.: 19/302,519

(22) Filed: Aug. 18, 2025

(51) Int. Cl.
*B60K 35/40* (2024.01)
*B60K 35/23* (2024.01)
*B60R 1/06* (2006.01)
*G06F 3/01* (2006.01)

(52) U.S. Cl.
CPC .............. *B60K 35/40* (2024.01); *B60K 35/23* (2024.01); *B60R 1/06* (2013.01); *G06F 3/012* (2013.01); *G06F 3/013* (2013.01); *G06F 3/017* (2013.01); *B60K 2360/146* (2024.01); *B60K 2360/741* (2024.01); *B60R 2300/10* (2013.01); *B60R 2300/205* (2013.01)

(58) Field of Classification Search
CPC .. B60R 1/12; B60R 1/07; B60R 11/04; B60R 2001/1253; B60W 40/08; B60W 2420/42; B60W 2540/225; B60W 2420/403
See application file for complete search history.

(56) References Cited

U.S. PATENT DOCUMENTS

| | | | | |
|---|---|---|---|---|
| 2020/0086794 A1* | 3/2020 | Kumon | B60K 35/10 |
| 2021/0323473 A1* | 10/2021 | Peterson | B60R 1/025 |
| 2022/0229534 A1* | 7/2022 | Terre | G06F 3/011 |
| 2023/0316782 A1* | 10/2023 | de Mersseman | G06V 20/59 348/148 |

FOREIGN PATENT DOCUMENTS

| | | | | |
|---|---|---|---|---|
| DE | 102008019732 A1 | 10/2009 | |
| DE | 102012203491 A1 | 9/2013 | |
| DE | 102013020950 A1 | 6/2015 | |
| KR | 20230000482 A | 1/2023 | |
| KR | 20230061851 A | 5/2023 | |
| WO | WO-2013109869 A1 * | 7/2013 | G06F 3/04883 |

* cited by examiner

*Primary Examiner* — Shaheda A Abdin
(74) *Attorney, Agent, or Firm* — Vivacqua Crane, PLLC

(57) ABSTRACT

A method for adjusting a display on a digital display for a vehicle includes capturing, by a camera, an image of a scene exterior to the vehicle. The method further includes displaying, on the digital display, a default portion of the image captured by the camera. The method further includes detecting, using a Driver Monitoring System (DMS), at least one of: a position, orientation, and gaze direction of a driver's head or torso. The method further includes determining, based on the detected position, orientation, and gaze direction, a gesture performed by the driver. The method further includes adjusting, in real time, a portion of the image displayed on the digital display based on the determined gesture. The adjusting comprising at least one of: zooming in or out, panning horizontally, and tilting vertically.

16 Claims, 3 Drawing Sheets

SYSTEM AND METHOD FOR ADJUSTING A DISPLAY ON A DIGITAL DISPLAY FOR A VEHICLE

INTRODUCTION

The present disclosure generally relates to a digital display for a vehicle. More particularly, the present disclosure relates to a system and method for adjusting a display on a digital display for a vehicle.

A digital display may be positioned on a display of a vehicle. The digital display displays a fixed image of a scene exterior to the vehicle. The fixed image displayed on the digital display is limited by resolution of the image and the size of the display of the vehicle. Additionally, the user may not, in real time, adjust the digital display by using a natural head and eye gaze mechanism or by using explicit means.

Thus, while current digital displays achieve their intended purpose, there is a need for a new and improved system and method for adjusting a display on a digital display for a vehicle.

SUMMARY

According to several aspects, a method for adjusting a display on a digital display for a vehicle is provided. The method includes capturing, by a camera, an image of a scene exterior to the vehicle. The method further includes displaying, on the digital display, a default portion of the image captured by the camera. The default portion has a default field of view narrower than an image field of view of the image. The method further includes detecting, using a Driver Monitoring System (DMS), at least one of: a position, orientation, and gaze direction of a driver's head or torso. The method further includes determining, based on the detected position, orientation, and gaze direction, a gesture performed by the driver. The gesture includes at least one of: a forward or backward head or torso movement, a lateral head or torso movement, or an upward or downward head movement. The method further includes adjusting, in real time, a portion of the image displayed on the digital display based on the determined gesture. The adjusting comprising at least one of: zooming in or out in response to the forward or backward head or torso movement, panning horizontally in response to the lateral head or torso movement, and tilting vertically in response to the upward or downward head movement.

In an additional aspect of the present disclosure, detecting, by the DMS, the forward or backward head or torso movement when the head or the torso moves along a longitudinal axis from a center point.

In another aspect of the present disclosure, detecting, by the DMS, the lateral head or torso movement when the head or the torso moves along a lateral axis from a center point.

In another aspect of the present disclosure, detecting, by the DMS, the upward or downward head movement when the head moves along a vertical axis from a center point.

In another aspect of the present disclosure, selecting the default portion by using a natural head-eye gaze mechanism.

In another aspect of the present disclosure, adjusting the portion of the image displayed on the digital display within an adjustment limit when the vehicle is traveling above a velocity threshold.

In another aspect of the present disclosure, adjusting the portion of the image displayed on the digital display based on the DMS or a module in the vehicle detecting at least one of: a button press, a speech command, a hand gesture, or a prolonged eye gaze. The adjusted image displayed temporarily exceeds an adjustment limit when the vehicle is traveling below a velocity threshold.

In another aspect of the present disclosure, reverting the digital display to the default portion when the vehicle is traveling above the velocity threshold or when the DMS detects the driver at a center point.

In another aspect of the present disclosure, detecting, by the camera, a new object and wherein reverting the digital display to the default portion.

According to several aspects, a system for adjusting a display on a digital display for a vehicle is provided. The system includes a Driving Monitor System (DMS). The DMS includes a motion sensor disposed within the vehicle detecting at least one of a position, orientation, and gaze direction of a driver's head or torso. The DMS further includes a camera capturing an image of a scene exterior to the vehicle. The system further includes a controller in communication with the DMS. The controller configured to display, on the digital display, a default portion of the image captured by the camera. The default portion has a default field of view narrower than an image field of view of the image. The d is further configured to determine, based on the detected position, orientation, and gaze direction, a gesture performed by the driver. The gesture comprising at least one of: a forward or backward head or torso movement, a lateral head or torso movement, or an upward or downward head movement. The controller is further configured to adjust, in real time, a portion of the image displayed on the digital display based on the determined gesture. The adjusting comprising at least one of: zooming in or out in response to the forward or backward head or torso movement, panning horizontally in response to the lateral head or torso movement, and tilting vertically in response to the upward or downward head movement. The system further includes the digital display displaying the portion of the image displayed determined by the controller.

In another aspect of the present disclosure, the DMS detects the forward head or torso movement when the head or the torso moves along a longitudinal axis from a center point.

In another aspect of the present disclosure, the DMS detects the lateral head or torso movement when the head or the torso moves along a lateral axis from a center point.

In another aspect of the present disclosure, the DMS detects the upward or downward head movement when the head moves along a vertical axis from a center point.

In another aspect of the present disclosure, select the default portion by using a natural head-eye gaze mechanism.

In another aspect of the present disclosure, adjusting the portion of the image displayed on the digital display within an adjustment limit when the vehicle is traveling above a velocity threshold.

In another aspect of the present disclosure, adjusting the portion of the image displayed on the digital display based on the DMS or a module in the vehicle detecting at least one of: a button press, a speech command, a hand gesture, or a prolonged eye gaze. The adjusted image displayed temporarily exceeds an adjustment limit when the vehicle is traveling below a velocity threshold.

In another aspect of the present disclosure, reverting the digital display to the default portion when the vehicle is traveling above the velocity threshold or when the DMS detects the driver at a center point.

In another aspect of the present disclosure, the camera detects an object and wherein the digital display reverts to the default portion.

According to several aspects, a tangible, non-transitory, machine-readable medium is provided. The tangible, non-transitory, machine-readable medium includes machine-readable instructions, that when executed by a processor, cause the processor to capture, by a camera, an image of a scene exterior to a vehicle. The machine-readable instructions further cause the processor to display, on a digital display, a default portion of the image captured by the camera. The default portion has a default field of view narrower than an image field of view of the image. The machine-readable instructions further cause the processor to detect, using a driver monitoring system (DMS), at least one of a position, orientation, and gaze direction of a driver's head or torso. The machine-readable instructions further cause the processor to determine, based on the detected position, orientation, and gaze direction, a gesture performed by the driver. The gesture includes: a forward or backward head and torso movement, a lateral head and torso movement, and an upward or downward head movement. The machine-readable instructions further cause the processor to adjust, in real time, a portion of the image displayed on the digital display based on the determined gesture. The adjusting includes at least one of: zooming in or out in response to the forward or backward head or torso movement, panning horizontally in response to the lateral head or torso movement, and tilting vertically in response to the upward or downward head movement.

In another aspect of the present disclosure, the DMS detects the forward head and torso movement when the head and the torso moves along a longitudinal axis from a center point. The DMS detects the lateral head and torso movement when the head and the torso moves along a lateral axis from a center point. The DMS detects the upward or downward head movement when the head moves along a vertical axis from a center point.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
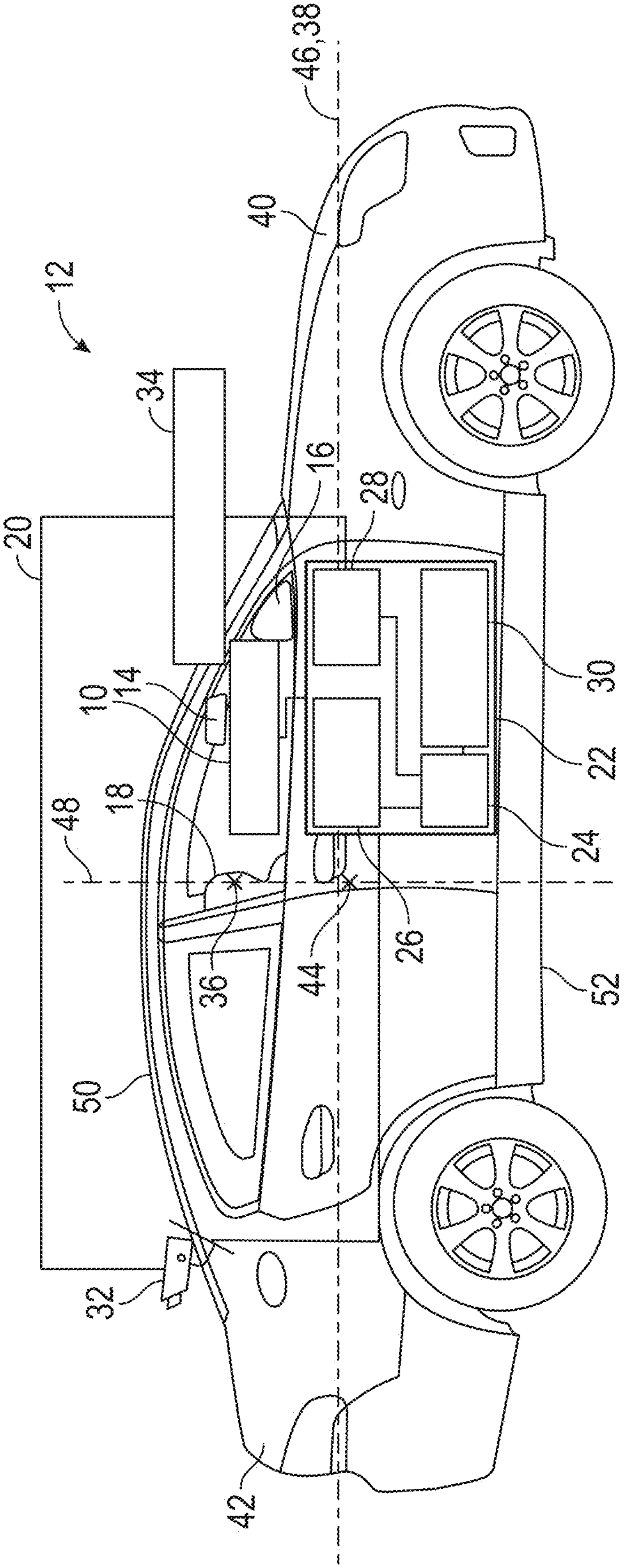
FIG. 1 is a schematic drawing of a driver monitoring system (DMS) adjusting a digital display in a vehicle according to an exemplary embodiment.

Referring to FIG. 1, a schematic drawing of a digital display 10 for a vehicle 12 is illustrated. The digital display 10 may be, but is not limited to, a rearview mirror 14, side mirrors 16, a Heads-Up Display (HUD), an Augmented Reality (AR) HUD, or a cluster display of the vehicle 12. The digital display 10 is configured to display a portion of an image. The portion of the image displayed is adjusted based on a position of a driver 18 disposed within the vehicle 12. It should be appreciated that FIG. 1 is merely exemplary in nature and the vehicle 12 may be any type of vehicle such as, but not limited to, a sedan, a truck, a sport utility vehicle, a van, or a motor home.

To adjust the portion of the image displayed on the digital display 10, a Driver Monitoring System (DMS) 20 is in communication with a controller 22. The controller 22 is disposed within the vehicle 12 and is configured to adjust the portion of the image displayed based on the communication received by the DMS 20. The controller 22 is a non-generalized electronic control device having a preprogrammed digital computer or processor 24, a memory 26, an input and output ports 28, and a transceiver 30.

The processor 24 can be a custom made or a commercially available processor, a central processing unit (CPU), a graphics processing unit (GPU), an auxiliary processor among several processors associated with the controller 22, a semiconductor-based microprocessor (in the form of a microchip or chip set), a macroprocessor, a combination thereof, or generally a device for executing instructions. The memory 26 is used to store a setting mode and an adjustment limit. The setting mode allows the driver 18 to determine a default portion displayed on the digital display 10. The digital display 10 may be, but is not limited to, the rearview mirror 14, the side mirrors 16, the HUD, the AR HUD, or the cluster display of the vehicle 12. The selection of the default portion is described in further detail below.

In addition, the memory 26 is used to record communication from the DMS 20. Recording the communication from the DMS enables the digital display 10 to adjust the image displayed based on the communication and the adjustment limit stored in the memory 26. The adjustment limit may be preprogrammed to ensure that the portion of the image displayed on the digital display 10 is in accordance with the European Regulation (ECER) 46, or any other regulation. The memory 26 further stores control logic, software applications, instructions, computer code, data, lookup tables, etc. The memory 26 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The input and output ports 28 receive communication from the DMS 20. The input and output ports 28 communicate the communication received from the DMS 20 to the processor 24. The processor 24 processes the communication to adjust the portion of the image displayed on the digital display 10. The transceiver 30 is configured to wirelessly communicate information to and from the DMS 20.

The DMS 20 includes a camera 32 and may include a motion sensor 34. The camera 32 may be, but is not limited to, a Red Green Blue (RGB) camera, or IR camera. The camera 32 is positioned on the vehicle 12 and captures the image of the scene exterior to the vehicle 12 in real time. The image captured by the camera 32 has an image field of view. The image field of view is about 50°. In this context, the term "about" is known to those skilled in the art. Alternatively, the term "about" may be read to mean plus or minus 5°. The camera 32 communicates the image captured to the controller 22. The controller 22 displays the portion of the image within the image field of view. The portion of the image displayed on the digital display 10 is about 25° of the image field of view. In this context, the term "about" is known to those skilled in the art. Alternatively, the term "about" may be read to mean plus or minus 5°. The controller 22 may adjust the portion of the image displayed on the digital display 10 based on the camera 32 feeding the images captured to a software module. The software module continuously detects the position of the driver 18, allowing the controller 22 to respond by continuously adjusting the image displayed.

Alternatively, the controller 22 may adjust the portion of the image displayed on the digital display 10 based on communication received from the motion sensor 34. The motion sensor 34 is disposed within the vehicle 12 and detects, in real time, an explicit means, a position, orientation, and/or gaze direction of the driver's 18 head or torso. The motion sensor 34 may be, but is not limited to, a near-infrared (NTR) camera sensor, an infrared (TR) light emitting diodes (LED), a photodiode array, a three-dimensional (3D) depth camera, or an Occupant Monitoring System (OMS). The motion sensor 34 continuously communicates the detected explicit means, position, orientation, and gaze direction of the driver's 18 head or torso to the controller 22. The controller 22 smoothly adjusts the portion of the image displayed on the digital display 10 in real time based on the natural head and gaze movement of the driver 18, creating an intuitive and user-friendly experience for the driver 18.

The portion of the image displayed on the digital display 10 may be the default portion. The default portion has a default field of view narrower than the image field of view. The default field of view is about 25° of the image field of view. The default portion may be selected by the driver 18 by using a natural head-eye gaze mechanism. The motion sensor 34 detects the head and eye motion of the driver 18 and communicates the motion to the controller 22 to create the default portion. Once the default portion is selected by the driver 18, the default portion is stored within the memory 26 of the controller 22 to automatically display the default portion, unless the driver 18 performs explicit means or gestures. The gestures and the explicit means are described in further detail below.

Figure 2B:
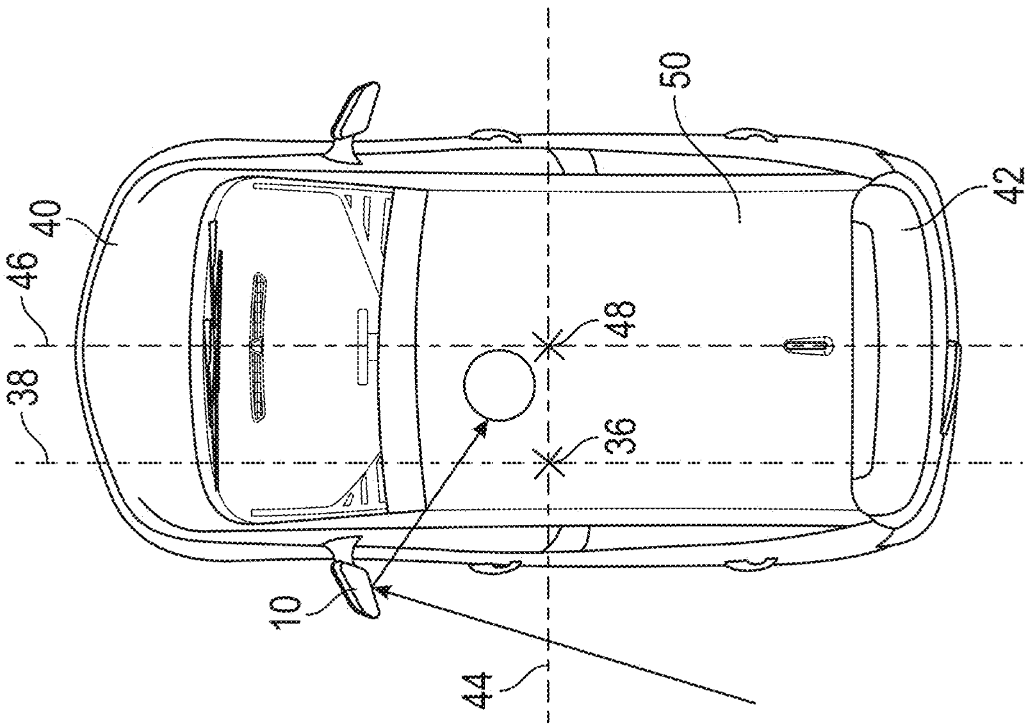
FIG. 2B is a top view of the vehicle with the driver in an alternate position within the vehicle according to an exemplary embodiment.
Figure 2A:
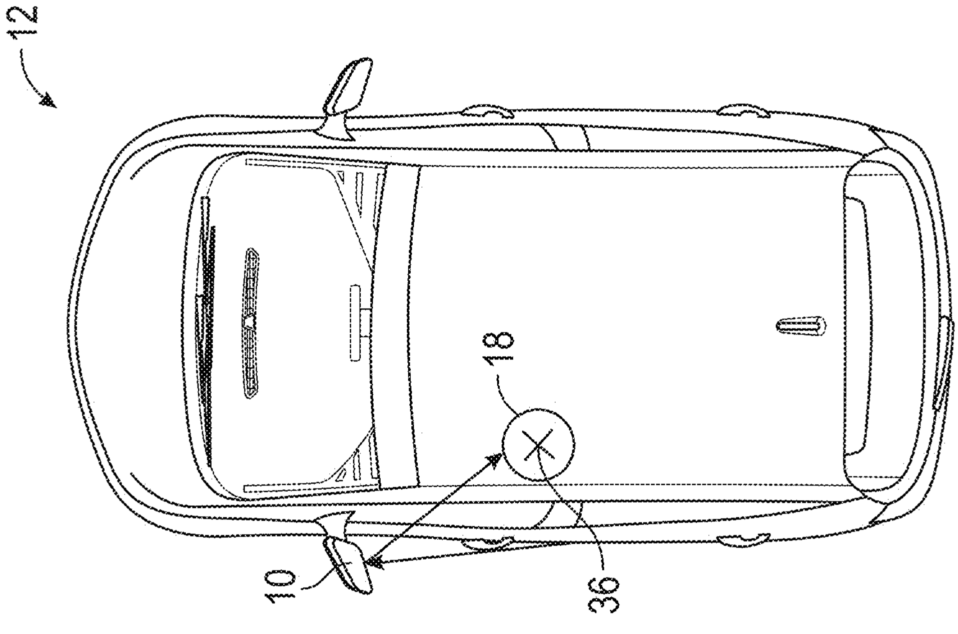
FIG. 2A is a top view of the vehicle with a driver in a position within the vehicle according to an exemplary embodiment.

FIG. 2A illustrates the driver 18 positioned at a center point 36 within the vehicle 12. While the driver 18 is positioned at the center point 36, the default portion is displayed on the digital display 10. The driver 18 is positioned at the center point 36 when the driver 18 is not performing one of the explicit means or one of the gestures.

Referring back to FIG. 1, the controller 22 may smoothly adjust the image displayed on the digital display 10 based on the DMS or a module in the vehicle detecting the explicit means performed by the driver 18. The explicit means may include, but are not limited to, a button press, a speech command, a hand gesture, or a prolonged eye gaze. When the driver 18 performs at least one of the explicit means, the controller 22 is configured to make an exaggerated adjustment to the default portion. The exaggerated adjustment exceeds the adjustment limit and will only be displayed when the vehicle is below a velocity threshold. The vehicle is below the velocity threshold when the vehicle is static or traveling at a low velocity. The vehicle is traveling at a low velocity when the vehicle is traveling up to about 5 miles per hour (mph). In this context, the term "about" is known to those skilled in the art. Alternatively, the term "about" may be read to mean plus or minus 1 mph. For example, the controller 22 may adjust the default portion for the digital display 10 to display an exaggerated zoom when the driver 18 performs an explicit mean, such as a speech command, while the vehicle 12 is parked. The image displayed reverts to the default portion when the driver stops performing the explicit means or the vehicle exceeds the velocity threshold.

Referring to FIGS. 1 and 2B, the controller 22 may also smoothly adjust the portion of image displayed on the digital display 10 based on the driver 18 performing at least one of the gestures. The motion sensor 34 detects motion of the driver 18 in real time and continuously communicates the motion to the controller 22. The continuous communication allows the controller 22 to detect the gestures in real time, smoothly adjusting the image displayed.

When the controller 22 determines that the driver 18 is performing at least one of the gestures and/or one of the explicit means, the controller 22 adjusts, in real time, the portion of the image displayed on the digital display 10 within the adjustment limit when the vehicle 12 exceeds the velocity threshold. Adjusting the portion of the image displayed on the digital display 10 based on gestures performed creates a similar image displayed as a traditional mirror. The gestures may include, but are not limited to, a forward or backward head or torso movement, a lateral head or torso movement, or an upward or downward head movement.

The controller 22 determines that the driver 18 is performing a forward or backward head or torso movement when the head and/or torso moves along a longitudinal axis 38 from the center point 36. The driver 18 is moving forward when the driver's 18 head and/or torso moves along the longitudinal axis 38 towards a hood 40 of the vehicle 12. As a response to the controller 22 determining that the driver 18 is moving forward, the controller 22 adjusts the portion of the image displayed by zooming in the default portion relative to the driver's movement. Alternatively, the driver 18 is moving backward when the driver's 18 head and/or torso moves along the longitudinal axis 38 towards a trunk 42 of the vehicle 12. As a response to the controller 22 determining that the driver 18 is moving backward, the controller 22 adjusts the portion of the image displayed by zooming out the default portion relative to the driver's movement.

The controller 22 determines that the driver 18 is performing a lateral head or torso movement when the head and/or torso moves along a lateral axis 44 from the center point 36. As a response to the controller 22 determining that the driver's 18 head or torso is moving laterally, the controller 22 adjusts the portion of the image displayed by panning the default portion horizontally. For example, if the driver's head and/or torso moves laterally towards a vehicle central axis 46, the controller 22 adjusts the portion of the image displayed by panning the default portion horizontally away from the vehicle central axis 46 relative to the driver's 18 movement. Additionally, if the driver's head and/or torso moves laterally away from the vehicle central axis 46, the controller 22 adjusts the portion of the image displayed by panning the default portion horizontally toward the vehicle central axis 46 relative to the driver's 18 movement.

The controller 22 determines that the driver 18 is performing an upward or downward head movement when the driver's 18 head moves along a vertical axis 48. The driver's 18 head is moving upward when the head moves along the vertical axis 48 towards a roof 50 of the vehicle 12. As a response to the controller 22 determining that the driver's 18 head is moving upward, the controller 22 adjusts the portion of the image displayed by vertically tilting the default portion along the vertical axis 48 towards a floor 52 of the vehicle 12 relative to the driver's 18 movement. Alternatively, the driver's 18 head is moving downward when the head moves along the vertical axis 48 towards the floor 52 of the vehicle 12. As a response to the controller 22 determining that the driver's 18 head is moving downward, the controller 22 adjusts the portion of the image displayed by vertically tilting the default portion along the vertical axis 48 towards the roof 50 of the vehicle 12 relative to the driver's 18 movement.

The controller 22 may determine that the driver 18 is performing more than one gesture. When the controller 22 determines that the driver 18 is performing more than one gesture, the controller 22 combines the adjustments mentioned above. For example, the controller 22 may determine that the driver 18 is performing a forward or backward head or torso movement, a lateral head or torso movement, and an upward or downward head movement. As a result, the controller 22 adjusts the portion of the image displayed by zooming in or out the default portion relative to the driver's 18 movement, by panning the default portion horizontally relative to the driver's 18 movement, and by vertically tilting the default portion along the vertical axis 48 relative to the driver's 18 movement. In an alternate example, as shown in FIG. 2B, the driver 18 may perform a forward head or torso movement and a lateral head or torso movement towards the vehicle central axis 46. The controller 22 adjusts the portion of the image displayed on the digital display 10 by zooming in the default portion and panning the default portion horizontally away from the vehicle central axis 46 relative to the driver's 18 movement.

The controller 22 may also revert the adjusted image to the default portion in a smooth manner. The controller 22 reverts the adjusted image displayed back to the default portion when the driver 18 returns to the center point 36. Alternatively, the controller may revert the adjusted image back to the default portion, while the driver is still performing at least one of the gestures or one of the explicit means, when the controller 22 detects a new object within the image but is not displayed. The object may be, but is not limited to, a vehicle, an animal, a person, a Vulnerable Road User (VRU), an unexpected item, etc. Reverting the adjusted image back to the default portion notifies the driver 18 of the detected new object.

Figure 3:
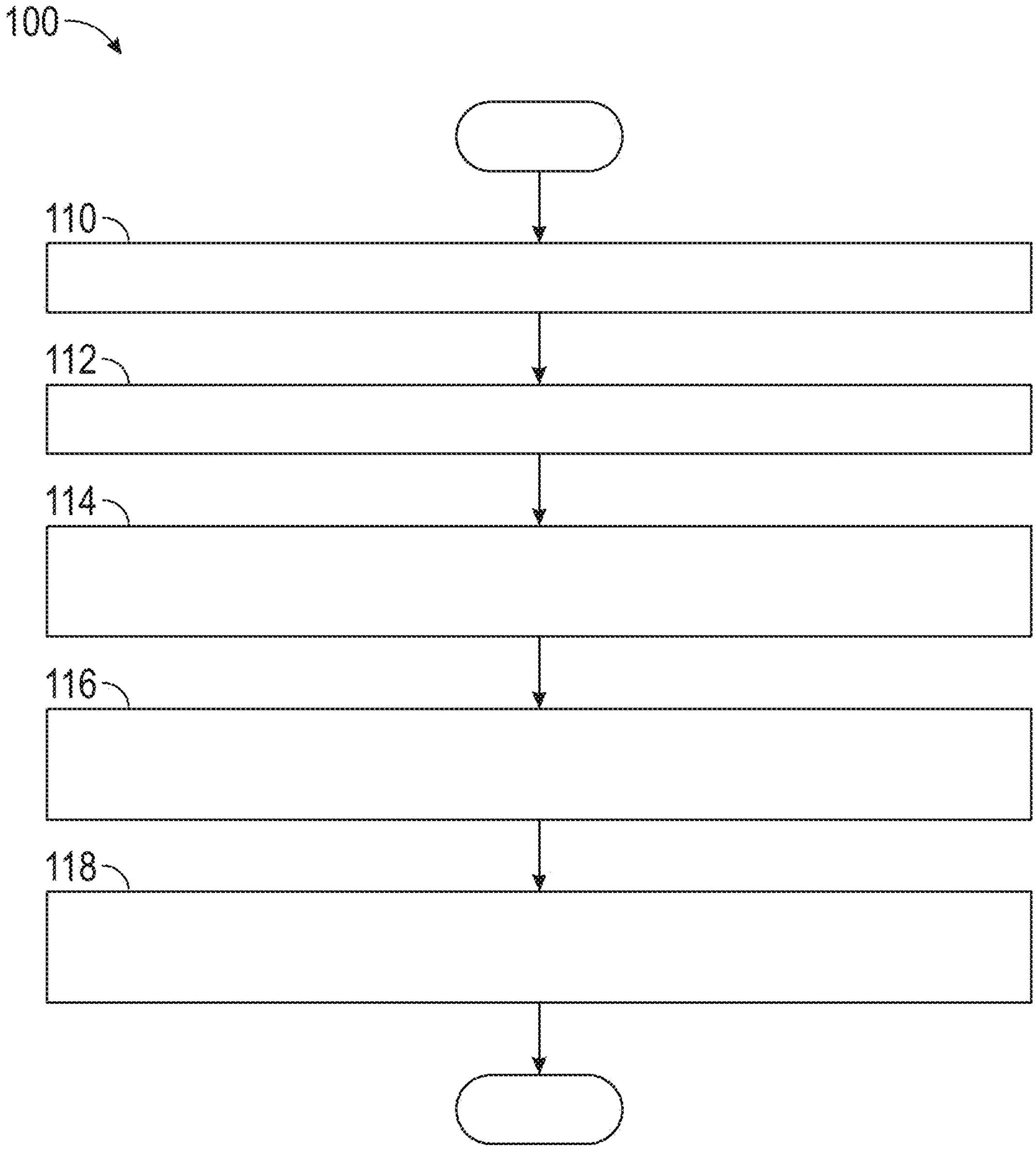
FIG. 3 is a flowchart for a method of adjusting an image displayed on the digital display according to an exemplary embodiment.

Referring to FIG. 3, a flowchart of a method 100 for adjusting the portion of the image displayed on a digital display 10 is illustrated. The method 100 begins with step 110. At step 110, the camera 32 captures the image of the scene exterior to the vehicle 12. The method 100 proceeds with step 112. At step 112, the digital display 10 displays the default portion selected by the driver 18. The driver 18 selects the default portion by using a natural head-eye gaze mechanism. The default portion has a default field of view of about 25° of the image captured by the camera 32. In this context, the term "about" is known to those skilled in the art. Alternatively, the term "about" may be read to mean plus or minus 5°. The method 100 proceeds with step 114.

At step 114, the motion sensor 34 of the DMS 20 detects at least one position, orientation, and gaze direction of the driver's 18 head or torso. The motion sensor 34 communicates the at least one position, orientation, and gaze direction of the driver's head or torso to the controller 22. The method 100 proceeds with step 116. At step 116, the controller 22 determines the gesture performed by the driver 18 based on the position, orientation, and gaze direction of the driver's 18 head or torso. The gesture performed may be a forward or backward head or torso movement, a lateral head or torso movement, and/or an upward or downward head movement.

The controller 22 determines that the driver 18 is performing a forward or backward head or torso movement when the head and/or torso moves along the longitudinal axis 38 from the center point 36. The driver 18 is moving forward when the driver's 18 head and/or torso moves along the longitudinal axis 38 towards the hood 40 of the vehicle 12. Alternatively, the controller 22 determines that the driver 18 is moving backward when the driver's 18 head and/or torso moves along the longitudinal axis 38 towards the trunk 42 of the vehicle 12.

The controller 22 determines that the driver 18 is performing a lateral head or torso movement when the head and/or torso moves along the lateral axis 44 from the center point 36. The controller 22 determines that the driver 18 is performing an upward or downward head movement when the driver's 18 head moves along the vertical axis 48. The driver's 18 head is moving upward when the head moves along the vertical axis 48 towards the roof 50 of the vehicle 12. Alternatively, the driver's 18 head is moving downward when the head moves along the vertical axis 48 towards the floor 52 of the vehicle 12. The method 100 proceeds with step 118.

At step 118, the controller adjusts the portion of the image displayed on the digital display based on the gesture performed by the driver 18. When the controller 22 determines that the driver is moving forward, the controller 22 adjusts the portion of the image displayed by zooming in the default portion relative to the driver's movement. As a response to the controller 22 determining that the driver 18 is moving backward, the controller 22 adjusts the portion of the image displayed by zooming out the default portion relative to the driver's movement.

As a response to the controller 22 determining that the driver's 18 head and/or torso is moving laterally, the controller 22 adjusts the portion of the image displayed by panning the default portion horizontally. For example, if the driver's head and/or torso moves laterally towards the vehicle central axis 46, the controller 22 adjusts the portion of the image displayed by panning the default portion horizontally away from the vehicle central axis 46 relative to the driver's 18 movement. Alternatively, if the driver's head and/or torso moves laterally away from the vehicle central axis 46, the controller 22 adjusts the portion of the image displayed by panning the default portion horizontally toward the vehicle central axis 46 relative to the driver's 18 movement.

As a response to the controller 22 determining that the driver's 18 head is moving upward, the controller 22 adjusts the portion of the image displayed by vertically tilting the default portion along the vertical axis 48 towards the floor 52 of the vehicle 12 relative to the driver's 18 movement. As a response to the controller 22 determining that the driver's 18 head is moving downward, the controller 22 adjusts the portion of the image displayed by vertically tilting the default portion along the vertical axis 48 towards the roof 50 of the vehicle 12 relative to the driver's 18 movement.

The digital display 10 of the present disclosure offers several advantages. These include smoothly adjusting the portion of the image displayed in real time based on the natural head and gaze movement of the driver 18. Adjusting the portion of the image displayed on the digital display 10 based on the gestures performed by the driver 18 creates an intuitive and user-friendly experience for the driver 18.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for adjusting a display on a digital display for a vehicle, the method comprising:

capturing, by a camera, an image of a scene exterior to the vehicle;

displaying, on the digital display, a default portion of the image captured by the camera, wherein the default portion has a default field of view narrower than an image field of view of the image;

detecting, using a Driver Monitoring System (DMS), at least one of a position, orientation, and gaze direction of a driver's head or torso;

determining, based on the detected position, orientation, and gaze direction, a gesture performed by the driver, the gesture comprising at least one of:

a forward or backward head or torso movement, a lateral head or torso movement, or an upward or downward head movement; and adjusting, in real time, a portion of the image displayed on the digital display based on the determined gesture, the adjusting comprising at least one of:

zooming in or out in response to the forward or backward head or torso movement, panning horizontally in response to the lateral head or torso movement and tilting vertically in response to the upward or downward head movement, wherein adjusting the portion of the image displayed on the digital display based on the DMS or a module in the vehicle detecting at least one of: a button press, a speech command, a hand gesture, or a prolonged eye gaze, and wherein adjusting the image displayed temporarily exceeds an adjustment limit when the vehicle is traveling below a velocity threshold, and wherein reverting the digital display to the default portion when the vehicle is traveling above the velocity threshold or when the DMS detects the driver at a center point.

2. The method of claim 1, wherein detecting, by the DMS, the forward or backward head or torso movement when the head or the torso moves along a longitudinal axis from a center point.

3. The method of claim 1, wherein detecting, by the DMS, the lateral head or torso movement when the head or the torso moves along a lateral axis from a center point.

4. The method of claim 1, wherein detecting, by the DMS, the upward or downward head movement when the head moves along a vertical axis from a center point.

5. The method of claim 1, wherein selecting the default portion by using a natural head-eye gaze mechanism.

6. The method of claim 1, wherein adjusting the portion of the image displayed on the digital display within an adjustment limit when the vehicle is traveling above a velocity threshold.

7. The method of claim 1, wherein detecting, by the camera, a new object and wherein reverting the digital display to the default portion.

8. A system for adjusting a display on a digital display for a vehicle, the system comprising:

a Driving Monitor System (DMS) including:

a motion sensor disposed within the vehicle detecting at least one of a position, orientation, and gaze direction of a driver's head or torso; and a camera capturing an image of a scene exterior to the vehicle;

a controller in communication with the DMS, the controller configured to:

display, on the digital display, a default portion of the image captured by the camera, wherein the default portion has a default field of view narrower than an image field of view of the image;

determine, based on the detected position, orientation, and gaze direction, a gesture performed by the driver, the gesture comprising at least one of:

a forward or backward head or torso movement, a lateral head or torso movement, or an upward or downward head movement;

adjust, in real time, a portion of the image displayed on the digital display based on the determined gesture, the adjusting comprising at least one of:

zooming in or out in response to the forward or backward head or torso movement, panning horizontally in response to the lateral head or torso movement, and tilting vertically in response to the upward or downward head movement; and the digital display displaying the portion of the image displayed determined by the controller, wherein adjusting the portion of the image displayed on the digital display based on the DMS or a module in the vehicle detecting at least one of: a button press, a speech command, a hand gesture, or a prolonged eye gaze, and wherein adjusting the image displayed temporarily exceeds an adjustment limit when the vehicle is traveling below a velocity threshold; and reverting the digital display to the default portion when the vehicle is traveling above the velocity threshold or when the DMS detects the driver at a center point.

9. The system of claim 8, wherein the DMS detects the forward head or torso movement when the head or the torso moves along a longitudinal axis from a center point.

10. The system of claim 8, wherein the DMS detects the lateral head or torso movement when the head or the torso moves along a lateral axis from a center point.

11. The system of claim 8, wherein the DMS detects the upward or downward head movement when the head moves along a vertical axis from a center point.

12. The system of claim 8, wherein select the default portion by using a natural head-eye gaze mechanism.

13. The system of claim 8, wherein adjusting the portion of the image displayed on the digital display within an adjustment limit when the vehicle is traveling above a velocity threshold.

14. The system of claim 8, wherein the camera detects an object and wherein the digital display reverts to the default portion.

15. A tangible, non-transitory, machine-readable medium, comprising machine-readable instructions, that when executed by a processor, cause the processor to:

capture, by a camera, an image of a scene exterior to a vehicle;

display, on a digital display, a default portion of the image captured by the camera, wherein the default portion has a default field of view narrower than an image field of view of the image;

detect, using a driver monitoring system (DMS), at least one of a position, orientation, and gaze direction of a driver's head or torso;

determine, based on the detected position, orientation, and gaze direction, a gesture performed by the driver, the gesture comprising:

a forward or backward head and torso movement, a lateral head and torso movement, and an upward or downward head movement; and adjust, in real time, a portion of the image displayed on the digital display based on the determined gesture, the adjusting comprising at least one of:

zooming in or out in response to the forward or backward head or torso movement, panning horizontally in response to the lateral head or torso movement and tilting vertically in response to the upward or downward head movement, wherein adjusting the portion of the image displayed on the digital display based on the DMS or a module in the vehicle detecting at least one of: a button press, a speech command, a hand gesture, or a prolonged eye gaze, and wherein adjusting the image displayed temporarily exceeds an adjustment limit when the vehicle is traveling below a velocity threshold; and reverting the digital display to the default portion when the vehicle is traveling above the velocity threshold or when the DMS detects the driver at a center point.

16. The tangible, non-transitory, machine-readable medium, comprising machine-readable instructions of claim 15, wherein the DMS detects the forward head and torso movement when the head and the torso moves along a longitudinal axis from a centerpoint, wherein the DMS detects the lateral head and torso movement when the head and the torso moves along a lateral axis from a center point, and wherein the DMS detects the upward or downward head movement when the head moves along a vertical axis from a center point.

* * * * *